(12) United States Patent
Baek et al.

(10) Patent No.: US 8,869,040 B2
(45) Date of Patent: Oct. 21, 2014

(54) APPLICATION SHARING SECURITY (75) Inventors: Diane Baek, Redmond, WA (US); Jean-Laurent Huynh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 12/983,840

(22) Filed: Jan. 3, 2011

(65) Prior Publication Data

US 2011/0099496 A1    Apr. 28, 2011

Related U.S. Application Data

(63) Continuation of application No. 11/849,669, filed on Sep. 4, 2007, now Pat. No. 7,877,693, which is a continuation of application No. 10/420,007, filed on Apr. 22, 2003, now Pat. No. 7,266,779.

(60) Provisional application No. 60/374,151, filed on Apr. 22, 2002.

(51) Int. Cl.
    G06F 15/00    (2006.01)
    G06F 13/00    (2006.01)
    H04L 29/06    (2006.01)
    H04L 29/08    (2006.01)

(52) U.S. Cl.
    CPC ............ *H04L 63/10* (2013.01); *H04L 63/1441* (2013.01); *H04L 67/148* (2013.01); *H04L 67/14* (2013.01); *H04L 63/104* (2013.01)
    USPC .......................................... 715/744; 715/778

(58) Field of Classification Search
    CPC .................................. H04L 67/1002
    USPC .................. 715/778, 744, 751, 851–853, 753
    See application file for complete search history.

(56) References Cited

U.S. PATENT DOCUMENTS

| 5,107,443 | A | 4/1992 | Smith et al. |
| 5,392,400 | A | 2/1995 | Berkowitz et al. |
| 5,689,641 | A | 11/1997 | Ludwig et al. |

(Continued)

FOREIGN PATENT DOCUMENTS

| JP | 08-286874 A | 11/1996 |
| JP | 08-287016 A | 11/1996 |

(Continued)

OTHER PUBLICATIONS

"Intranet Which Stays One Step Ahead: Drawback of Intranet Being Overcome by Original Scheme," Nikkei Open Systems, pp. 194-199, Nikkei Business Publications, Inc., Aug. 15, 1007, Japan.

(Continued)

*Primary Examiner* — Kevin Nguyen
(74) *Attorney, Agent, or Firm* — Andrew Smith; Peter Taylor; Micky Minhas (57) ABSTRACT

A method, apparatus and computer-readable medium for facilitating application sharing. In operation, a user selects at least one of a plurality of applications operating on a first computer to share with at least a second computer. The user then selects at least one of a plurality of security measures for preventing a user operating the second computer from performing at least one of a plurality of unauthorized operations. Next, the user initiates applications sharing on the first computer, wherein the user operating the second computer may access or observe an application running on the first computer, but may not perform any unauthorized operations on the first computer.

19 Claims, 9 Drawing Sheets

(56) References Cited

U.S. PATENT DOCUMENTS

| | | | |
|---|---|---|---|
| 5,758,110 | A | 5/1998 | Boss et al. |
| 5,796,396 | A | 8/1998 | Rich |
| 5,799,191 | A | 8/1998 | Moriyasu et al. |
| 6,199,101 | B1 | 3/2001 | Pfaff et al. |
| 6,266,691 | B1 | 7/2001 | Watanabe et al. |
| 7,266,779 | B2 | 9/2007 | Baek et al. |
| 7,451,181 | B2 | 11/2008 | Sasaki et al. |
| 2002/0069369 | A1* | 6/2002 | Tremain ................... 713/201 |
| 2003/0055894 | A1* | 3/2003 | Yeager et al. ............. 709/204 |
| 2004/0039828 | A1 | 2/2004 | Coleman et al. |

FOREIGN PATENT DOCUMENTS

| | | |
|---|---|---|
| JP | 09-062630 A | 3/1997 |
| JP | 09-190411 A | 7/1997 |
| JP | 2000-099233 A | 4/2000 |
| JP | 2000-207363 A | 7/2000 |

OTHER PUBLICATIONS

Supplementary European Search Report for Application No. 03724147.8, dated May 20, 2010, 3 pages.

* cited by examiner

APPLICATION SHARING SECURITY

CROSS-REFERENCE TO RELATED APPLICATIONS

This application claims the benefit of U.S. provisional application Ser. No. 60/374,151, filed Apr. 22, 2002, the disclosure of which is hereby incorporated by reference herein.

DESCRIPTION OF THE INVENTION

1. Field of the Invention

The present invention relates to the field of securely allowing remote users to share computer applications from a remote computer.

2. Background of the Invention

Application sharing, also known as two-way sharing, allows a computer user to share control of his or her computer with a remote user. Application sharing can take any of several forms, including single application sharing, desktop sharing, or view sharing. Single application sharing allows one or more meeting participants to control a single application, while limiting the remote user's input and control of the sharing presenter's computer to that single application. Desktop sharing allows one or more meeting participants to view and control the entire visible portion of the sharing presenter's display. In either case, the visible portions of the desktop are displayed to all meeting participants, however the two forms differ in the amount of control or input allowed to the remote user. View sharing, also known as one-way sharing, allows one or more meeting participants to view, but not control the visible portion of the sharing presenter's computer.

An application sharing session is also referred to as a meeting, and may consist of one or more remote computers, each controlled by a user, or meeting participant. The term "meeting participants" includes all attendees and presenters in a meeting. Meeting participants include at least one sharing presenter and at least one sharing participant. The sharing presenter is the participant who allows others to control his or her computer (sharing control). The sharing participant is the meeting participant to whom the sharing presenter has granted sharing control.

In the course of an application sharing meeting, it is not only necessary for the sharing presenter to be able to grant sharing control to other users, but it is also useful for the sharing presenter to be able to control, or limit the ability of remote sharing participants to input and/or control the application and the sharing presenter's computer.

It is accordingly a feature of the invention to permit users to securely access applications or desktops of a remote computer, while maintaining the security of the desktop to which they are granting access.

SUMMARY OF THE INVENTION

In accordance with the present invention, a method, apparatus and computer-readable medium for facilitating application sharing is disclosed. In operation, a user selects at least one of a plurality of applications operating on a first computer to share with at least a second computer. The first computer user then selects at least one of a plurality of security measures for preventing a user operating the second computer from performing at least one of a plurality of unauthorized operations. Next, the first computer user initiates applications sharing on the first computer, wherein the user operating the second computer may access or observe an application running on the first computer, but may not perform any unauthorized operations on the first computer.

Additional features and advantages of the invention will be set forth in part in the description that follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary only and not restrictive of the invention as claimed.

BRIEF DESCRIPTION OF THE DRAWINGS

The accompanying drawings, which are incorporated in and constitute a part of this specification, illustrate several implementations, and together with the description, serve to explain the principles of the invention.

DETAILED DESCRIPTION

In the following detailed description of one embodiment of the present invention, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Turning first to the nomenclature of the specification, the detailed description, which follows, is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require logical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. In other words, the operations described herein are machine operations performed in conjunction with a human operator or user who interacts with the computer. The machines used for performing the operation of the present invention include general-purpose digital computers or other similar computing devices.

In addition, it should be understood that the programs, processes, methods described herein are not related or limited to any particular computer or apparatus. Rather, various types of general-purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general-purpose computers, workstations, or personal computers are connected via communication links of various types. In a client server arrangement, programs and data, many in the form of objects, are made available by various members of the system.

For illustration purposes, aspects of the invention are described to provide examples of how computer system according to the invention may be used to share applications between two or more computers. One of skill in the art will realize and appreciate that the present invention may be used in other sharing scenarios without departing from the spirit and scope of the present invention.

The examples described in the text are often accompanied by figures illustrating user interface displays that may be produced through use of a computer system according to the invention to implement the virtual showroom. These too are illustrative and are not intended to limit the invention in any way.

Referring now to the drawings, in which like numerals represent like elements throughout the several figures, embodiments of the present invention will be described.

An application sharing meeting is accomplished using a sharing frame. The sharing presenter's computer displays an application to be shared and a User Interface (UI) for controlling the sharing facility. The sharing participant's computer displays an image of some or all of the sharing presenter's computer display. Once sharing has been established/confirmed, input into the sharing participant's display will be sent to the sharing presenter's computer/application. During sharing, the sharing module may share inputs by transmitting mouse commands, key presses, or other input devices from the sharing participant through to the shared application.

Figure 1:
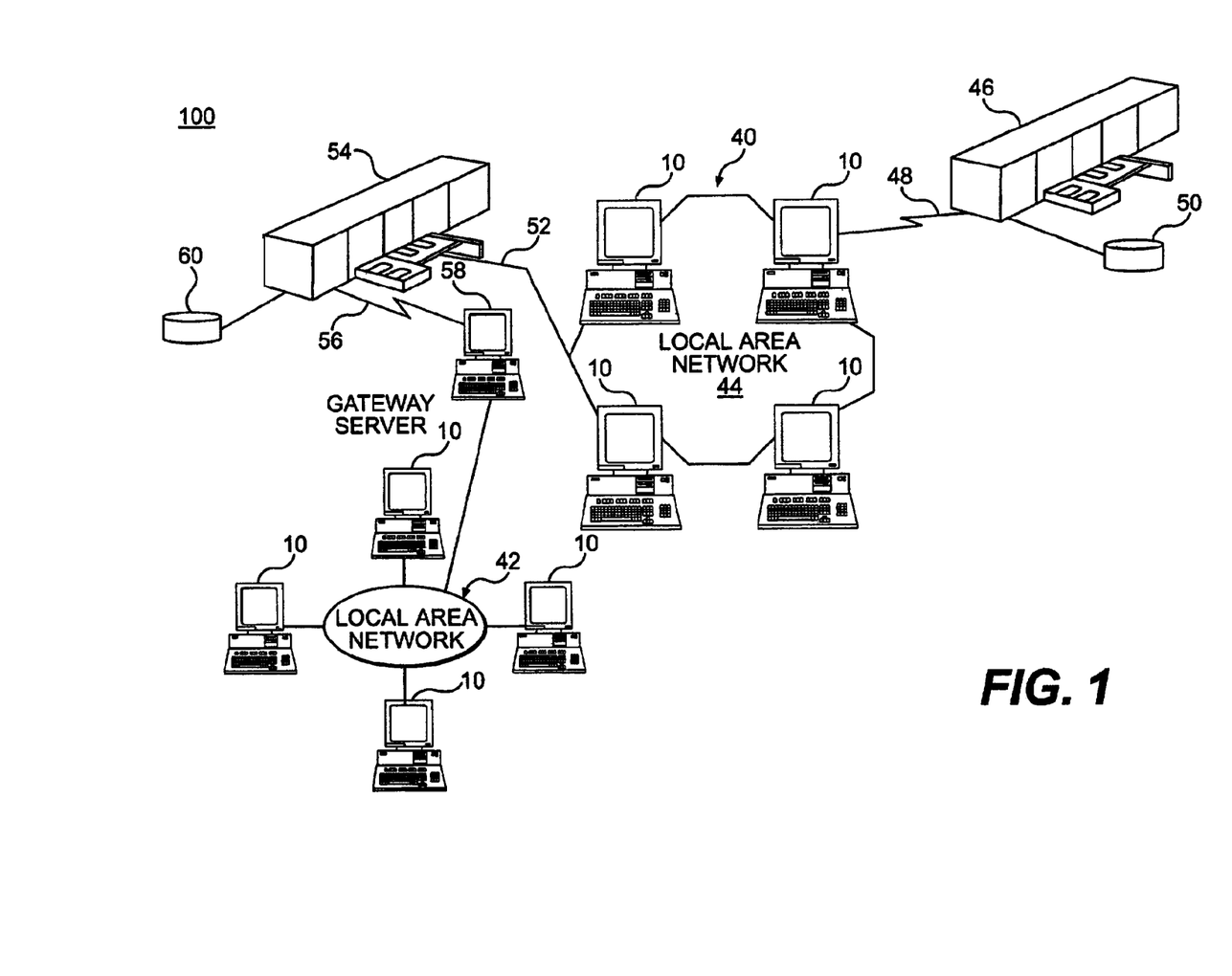
FIG. 1 is a depiction of an exemplary data processing network in which the present invention may be practiced.

Referring now to FIG. 1, there is shown a data processing network 100 in which the present invention may be practiced. Data processing network 100 includes a plurality of individual networks, including LANs 42 and 44, each of which includes a plurality of individual computers 10. Alternatively, as those skilled in the art will appreciate, a LAN may comprise a plurality of intelligent workstations coupled to a host processor. LAN 44 may be directly coupled to another LAN (not shown), a mainframe 54 or a gateway server 58. Gateway server 58 is preferably an individual computer or intelligent workstation that serves to indirectly link LAN 42 to LAN 44. Data processing network 100 may also include multiple servers in addition to server 58. Mainframe computers 46 and 54 may be preferably coupled to computer 10, LAN 44 and server 58 by communications links 48, 52 and 56, respectively. More specifically, link 48 is used to couple mainframe computer (46 and 54) to computer 10; link 52 is used to couple mainframe computer (46 and 54) to LAN 44; and link 56 is used to couple mainframe computer (46 and 54) directly to server 58 (indirectly to LAN 42). A communication link refers to any means for connecting two computing devices together, including Internet, Intranet, Extranet, ISDN, DSL, LAN and any future connection systems. The communication link can be provided by wired lines such as cable, optical lines, or telephone lines. It can be connected to the computer by any commercially available format of communication such as COM port, parallel port, USB port. In addition to connected wires, the communication channel may be in the form of a wireless channel such as RF and infrared channels. Mainframe computers 46 and 54 may also be coupled to storage devices 50 and 60, respectively, which may serve as remote storage for LANs 44 and 42, respectively. Those skilled in the art will appreciate that the server 58 may be located a great geographic distance from the LAN 42. Similarly, the LAN 44 may be located a substantial distance from the LAN 42.

As shown, a system in accordance with embodiments of the present invention comprises a plurality of computers 10 and associated servers and mainframes. The servers may be generally similar to the computers 10 including a central processing unit, display device, memory and operator input device. Moreover, it will be appreciated that computer 10 may also perform operations described herein as being performed by server 58, and similarly server 58 may perform operations described herein as being performed by computer 10. The distributed system may comprise any one of a number of types of networks over which workstations and servers communicate, including LANs, wide area networks (WANs), Intranets, the Internet and any other networks that distribute processing and share data among a plurality of nodes. At various locations, preferably geographically remote from each other, a number of intermediate local servers may connect server 58, and LANs 42 and 44 via network 100 to individual computers 10. All of these configurations, as well as the appropriate communications hardware and software, are known in the art.

Figure 2:
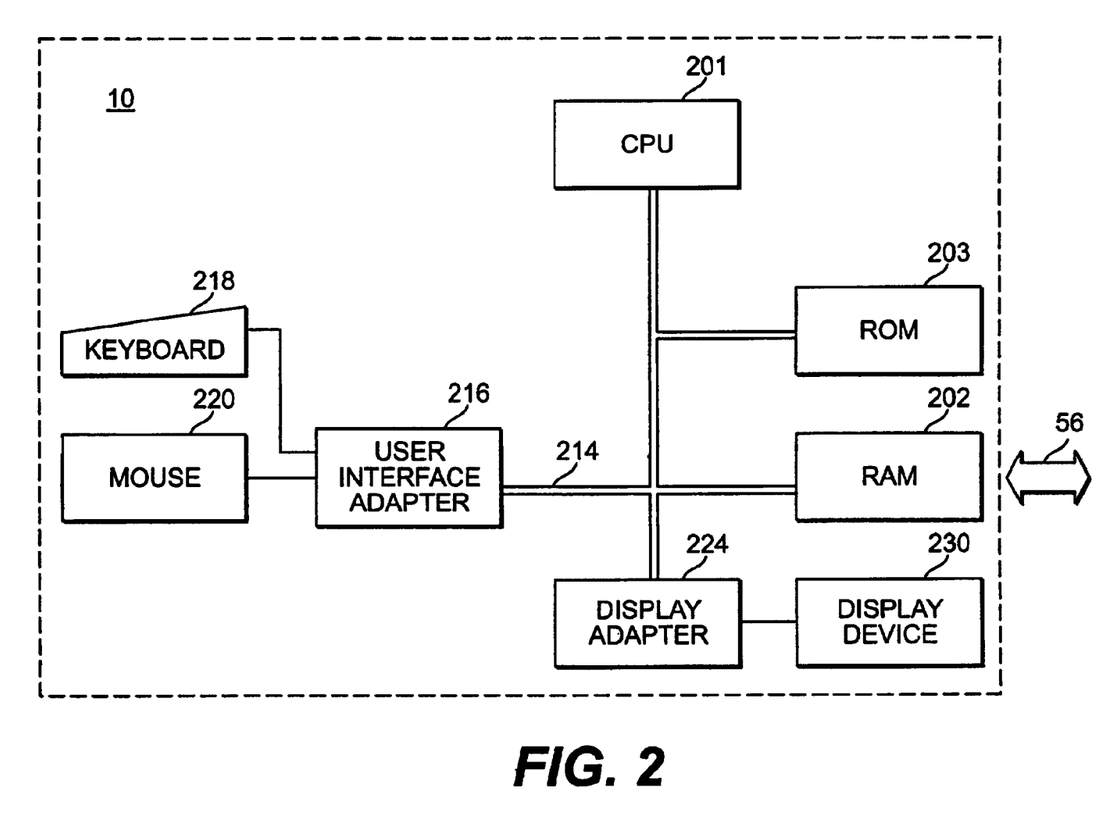
FIG. 2 is a block diagram depiction of a computer upon which the present invention may operate.

FIG. 2 illustrates a block diagram of computer 10 as shown in FIG. 1. Computer 10 includes CPU 201, RAM 202, ROM 203, user interface adapter 216, keyboard 218, mouse 220, display adapter 224, display device 230 and network interface 56. Network interface 56 links computer 10 to network 100. CPU 201 is preferably connected to each of the elements of computer 10 via bus 214. CPU 201 executes program instructions stored in RAM 202 and ROM 203 to perform various functions of the present invention. Although computer 10 is described as being implemented with a single CPU 201, in alternative embodiments, computer 10 could be implemented with a plurality of processors operating in parallel or in series.

CPU 201 is preferably programmed to receive data from, and transmit information to, network interface 56 in response to user requests. Network interface 56, in turn, receives data streams from CPU 201 and network 100 formatted according to respective communication protocols. Network interface 56 reformats the data streams appropriately and relays the data streams to network 100 and CPU 201, as necessary. Network interface 56 preferably accommodates several different communication protocols including Hypertext Transfer Protocol (HTTP) and File Transfer Protocol (FTP).

Figure 3:
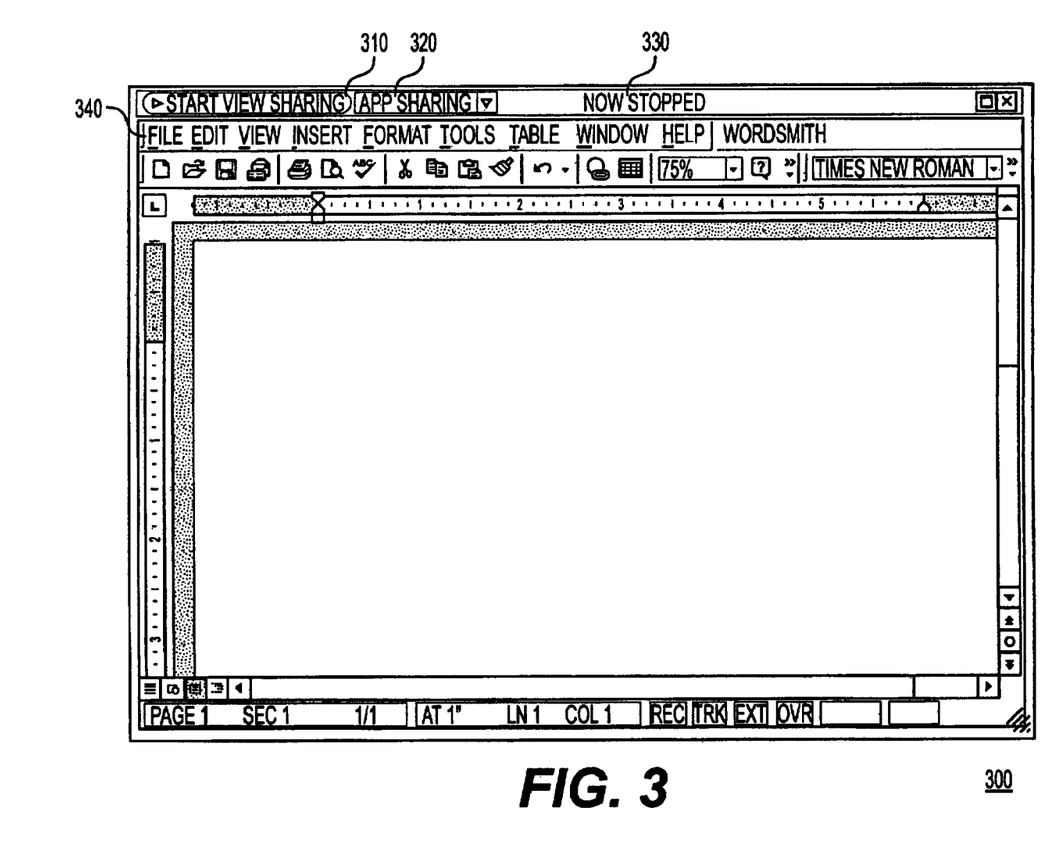
FIG. 3 is a representation of a sharing frame in accordance with one embodiment of the present invention.

In the context of the present invention, application sharing is the process whereby an administrator, organizer or presenter specifies the level of access that a remote user may have to a presenter's computer. In one exemplary embodiment, application sharing is implemented through the use of a sharing frame displayed on the presenter's computer. Referring now to FIG. 3, there is shown a depiction of a sharing frame 300 that may be shown on a presenter's computer in accordance with one embodiment of the present invention. As shown, sharing frame 300 comprises a Start View Sharing button 310, an Application Sharing menu 320, a Sharing Status message 330, and an Application menu 340.

Figure 4:
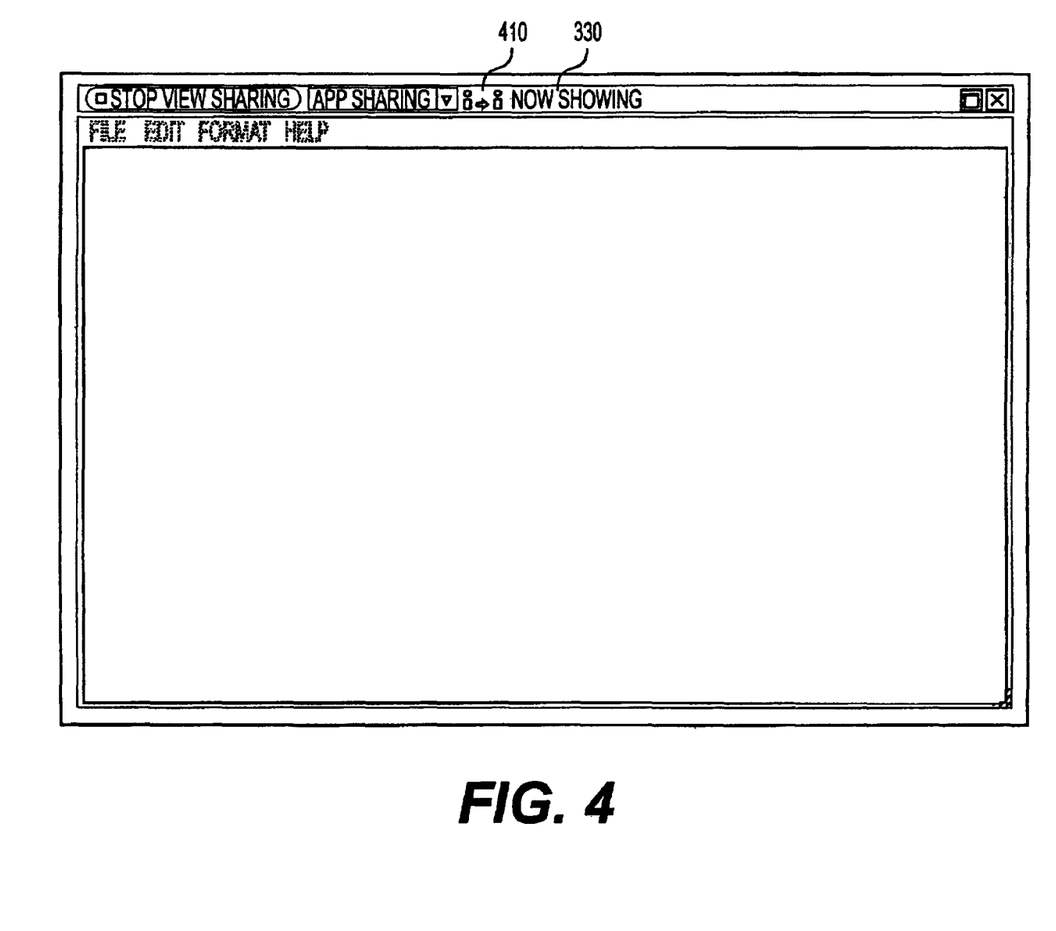
FIG. 4 is a representation of a sharing frame in accordance with a second embodiment of the present invention.

When a presenter seeks to initiate view sharing, she simply initiates the present invention, which causes a sharing frame 300 to be displayed on the presenter's computer. In one embodiment, the presenter may initiate the present invention by pressing a button on the keyboard, right clicking a mouse button, or otherwise initiating a short cut to begin execution of the present invention. Once sharing frame 300 is displayed, the presenter then positions sharing frame 300 over the desired area on her display and presses 'Start View Sharing' button 310. Sharing frame 300 is a frame that may be used to encircle all or part of a presenter computer's display. An image of the data enclosed in sharing frame 300 will be immediately transmitted to a remote user. Any portion of the display outside of sharing frame 300 is not visible to a remote user. The presenter may add/delete shared applications and windows, add/delete users, and add/delete filters by activating 'Application Sharing' menu 320. Turning to FIG. 4, it is shown that when sharing has begun, Sharing Status message 330 changes from "Now Stopped" to 'Now Showing,' 'Start View Sharing' button 310 changes to 'Stop View Sharing', and a sharing icon 410 is displayed.

The presenter controls which applications will be shared with one or more remote users by placing the applications sought to be shared inside the sharing frame. The presenter alternatively, may share all of her applications with a remote user (desktop sharing), by re-sizing sharing frame 300 to be substantially the same length and width as the presenter's display. In so doing, every application executing on the presenter's display will also be available for sharing on the remote user's computer. If items of the presenter's display such as applications, icons, or the desktop appear in that area of the screen, and the transmission is enabled, then the sharing participants can see them (and potentially control them). Sharing frame 300 allows the presenter to determine quickly and easily if remote participants can see or control applications on the presenter's computer.

In a Windows™ environment, the selection of a particular application for sharing may be performed as follows. The sharing presenter may select, such as by "clicking on" a particular icon associated with an application outside of sharing frame 300 to indicate which application the presenter would like to place inside of sharing frame 300 (i.e., share). The sharing module (not shown) operating on the presenter's computer may then automatically resize sharing frame 300 to accommodate the new icon, or sharing module may simply move an image of the selected icon into the current sharing frame 300. In another operating system environment, the sharing presenter may similarly select an application by typing in the application's name (or identifier), or otherwise indicating the application to be shared.

Whenever two users are sharing applications, one embodiment of the present invention may display one or more graphical cues on the presenter's display and/or the user's display to quickly remind the presenter and/or the participant that at least one other computer is sharing applications. The application sharing control user interface (UI) itself may indicate remote access. In one embodiment, a sharing frame 300 may change color to indicate 'view' sharing versus 'application' sharing. The color should change to a color that is sufficiently different from the original color to be noticeable to the user. For example, the color of the frame may normally be brown. Changing the color to a color such as red would be noticeable without unnecessarily alarming the presenter or user.

In addition to graphical cues, multiple textual cues may remind the sharing presenter that a remote user has access to her computer. In the example with the graphical frame, to quickly and redundantly remind the sharing presenter that a participant shares control of the presenting computer, a message may appear on the title bar of the frame as another cue. This message may remind the presenter that another participant has control of the presenting computer and the name of the sharing participant. Since the frame can be resized, potentially truncating the message, the variably sized name of the participant may be placed at the end of the message and the instructions informing the presenter how to end the sharing, such as "ESC to stop," may appear at the beginning of the message.

Since the presenter's focus may be somewhere else, multiple locations for these cues help to quickly and redundantly remind the sharing presenter that a participant has control of the presenting computer. For example, other parts of the presenter's meeting UI may be replaced with messages indicating that another user is sharing control. All participants in the meeting might see the messages.

Providing the presenter a consistent location to go to in order to determine this remote access helps to quickly and redundantly remind the sharing presenter that a participant shares control of the presenting computer. This consistent location may have changing graphical or textual cues. For example, a status bar can provide a consistent location and icons may provide the small and easily identifiable graphical cues. An icon similar to icon 410 (FIG. 4) may be shown, or an icon similar to the icon depicted below may be shown.

In one embodiment, the figure in the left column may represent the sharing presenter, and the figure in the right column may represent the sharing participant. The arrow from left to right represents the data for the presentees display sent from the presenter's computer to the participant's computer, and the arrow from right to left represents the sharing participant's ability to send keyboard, mouse, and other input to the sharing presenter's computer. When the sharing participant is sending such input (i.e., controlling the presenter's application(s)), the upper arrow may blink giving an indication that someone is remotely controlling the computer. In one embodiment, this interactive icon may be displayed on all computers participating in a sharing session to inform the other users when someone else is controlling the application.

During a sharing session, the sharing module transmits an identical screen image of the data depicted in sharing frame 300 to the one or more remote user's display. The sharing module (not shown) may share inputs from users by transmitting mouse clicks, keyboard inputs, or other input received from a user through the shared application. A user may be granted access to the presenter's entire desktop (desktop sharing), or to one or more applications operating on the presenter's desktop (application sharing). If the presenter does not want to share a particular application, she can move (i.e., use a mouse to click and drag) the application's icon outside of the sharing frame.

When the presenter opens one or more windows for a particular application (e.g., the presenter may open one or more individual Word™ documents), she may further limit sharing to a subset of the total windows for each application (e.g., one Word™ document). If no part of that window is visible within the frame, then the sharing participant cannot move that window into view even if that window is part of the shared application. The presenter can further refine what is shared and what is not shared by sharing a different size and portion of the screen. Furthermore, the frame may be moved, reshaped, or resized to represent which portion of the screen to share. If desired, the sharing presenter could position and resize multiple windows and then position the frame around those windows hiding all of the desktop background.

In one embodiment, to share an application or window, the native application (on the presenter's computer), calls a process (e.g., the GetWindowThreadProcessId) on the selected window, and saves the returned process id. GetWindowThreadProcessId is called on the window of future mouse and keyboard events. If that process id does not match the saved process id, then those events are ignored. The implementation allows most application's spawned windows [e.g. Open dialogs, Find dialogs, Tool bars, etc.] to be shared along with the selected window. If, however, the application uses a separate process for these other windows, then these other windows will not be shared.

The de-selection of a particular application may be performed similarly to the process performed when an application is selected for sharing. In particular, the sharing presenter may select a particular icon or window inside sharing frame 300 that the presenter would no longer like to share. The presenter may activate a different button on the mouse or she may press a different key on the keyboard to indicate that she would like to deselect the window or application. The sharing module (not shown) operating on the presenter's computer may then automatically resize sharing frame 300 to exclude the new icon. Alternatively, sharing module may simply move the icon outside of sharing frame 300 without changing the size of sharing frame 300.

Instead of deleting an entire application, the presenter may want finer controls to provide a remote user with less than full access to the application. For example, a presenter may choose to provide a remote user with access to a particular application, but limit the number of functions associated with that application that the remote user may access. Examples of finer controls include controls to limit visual access and interactive control to visible portions of the screen.

The use of menu bars from the shared application may provide more control to remote users. For example, a sharing presenter might want to share a single document, but a remote user could open up other documents using the 'Open' option (not shown) on the File menu. FIG. 3 shows an exemplary sharing frame in which a user can access the commands in the menu bar. In that instance, a sharing participant could open up dialogs that were intended to be shared such as the 'Save' option (not shown). However, by selecting the Save option in the File menu, an application might display a mini-Explorer window allowing the sharing participant to traverse the file system hierarchy. By right clicking one of those files, the sharing participant could accidentally delete it or even launch another application using the "Open with . . . " (not shown) menu feature.

Different ways to disable menu bars include hiding the menu outside of the viewable portion of the screen, disallowing the ability to click on these menus, masking out the menu (FIG. 7), or disallowing right clicks on icons. Remote access to menu bars may be automatically limited or specifically limited by the presenter.

Figure 5:
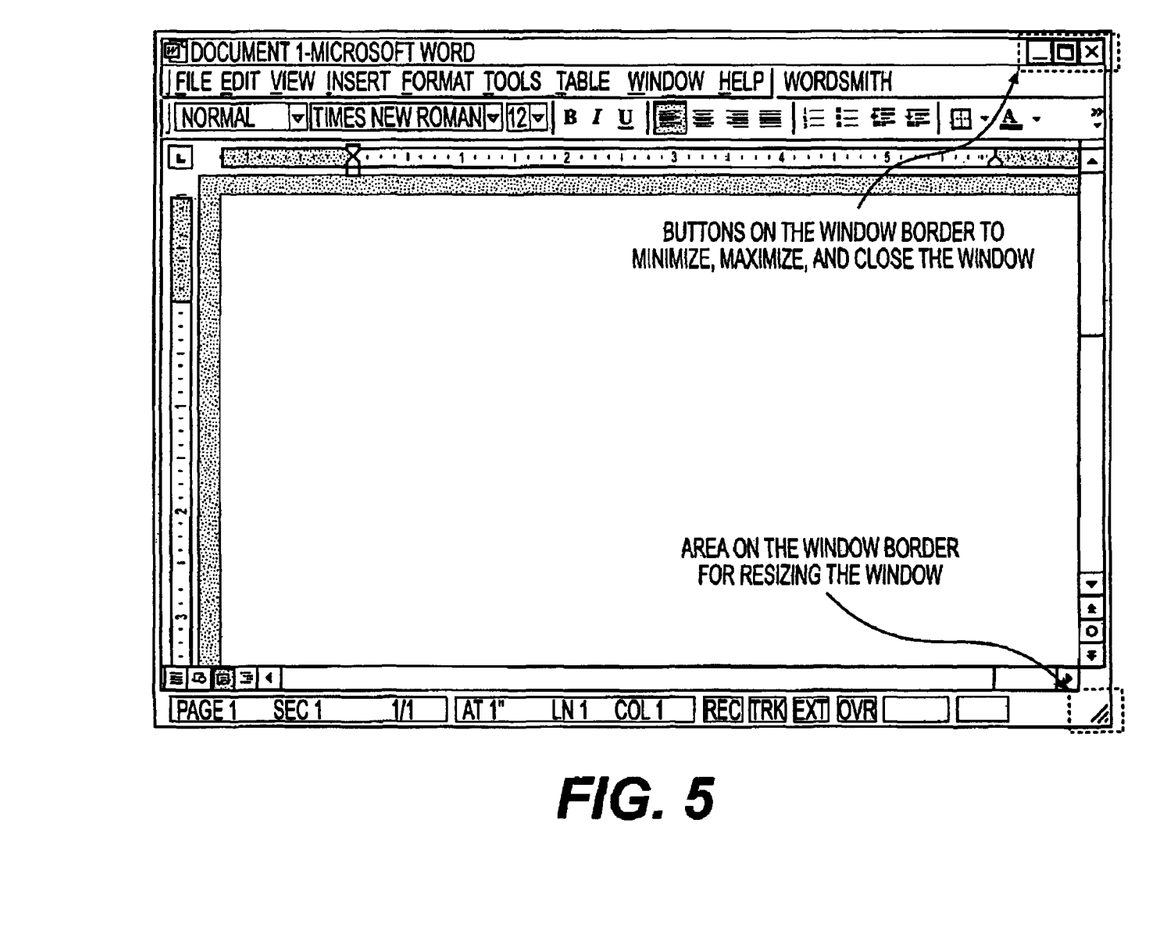
FIG. 5 is a representation of a sharing frame in accordance with a third embodiment of the present invention.
Figure 6:
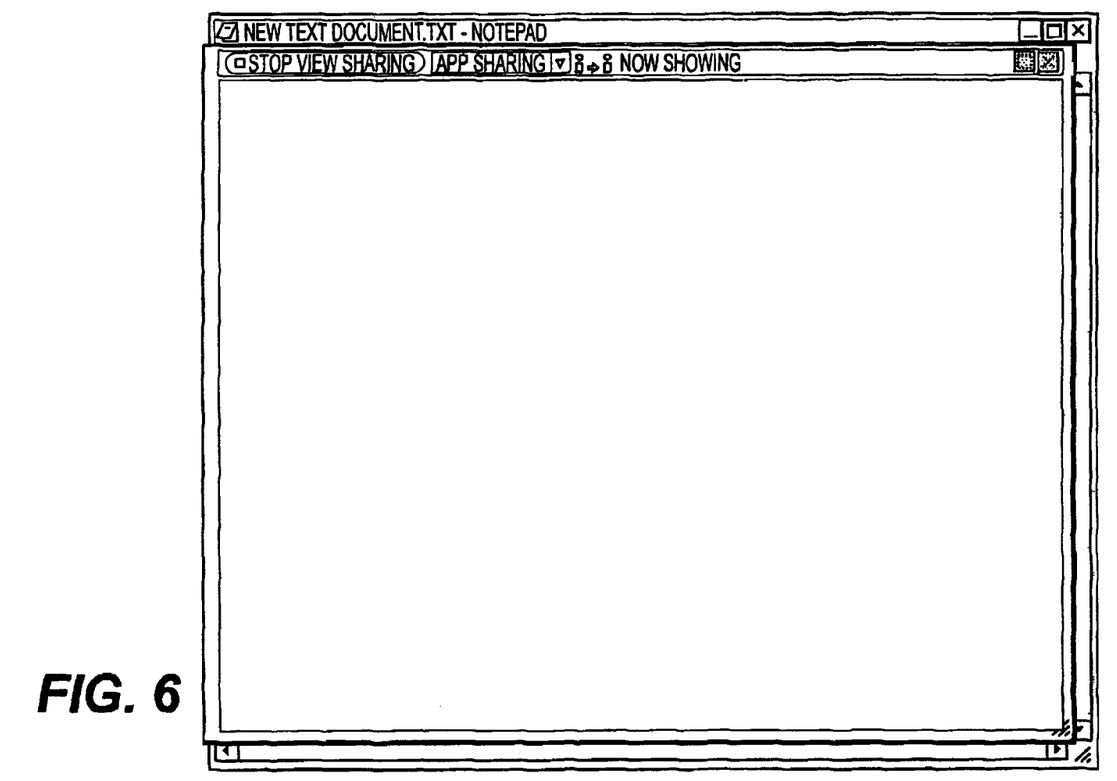
FIG. 6 is a representation of a sharing frame in accordance with a fourth embodiment of the present invention.
Figure 7:
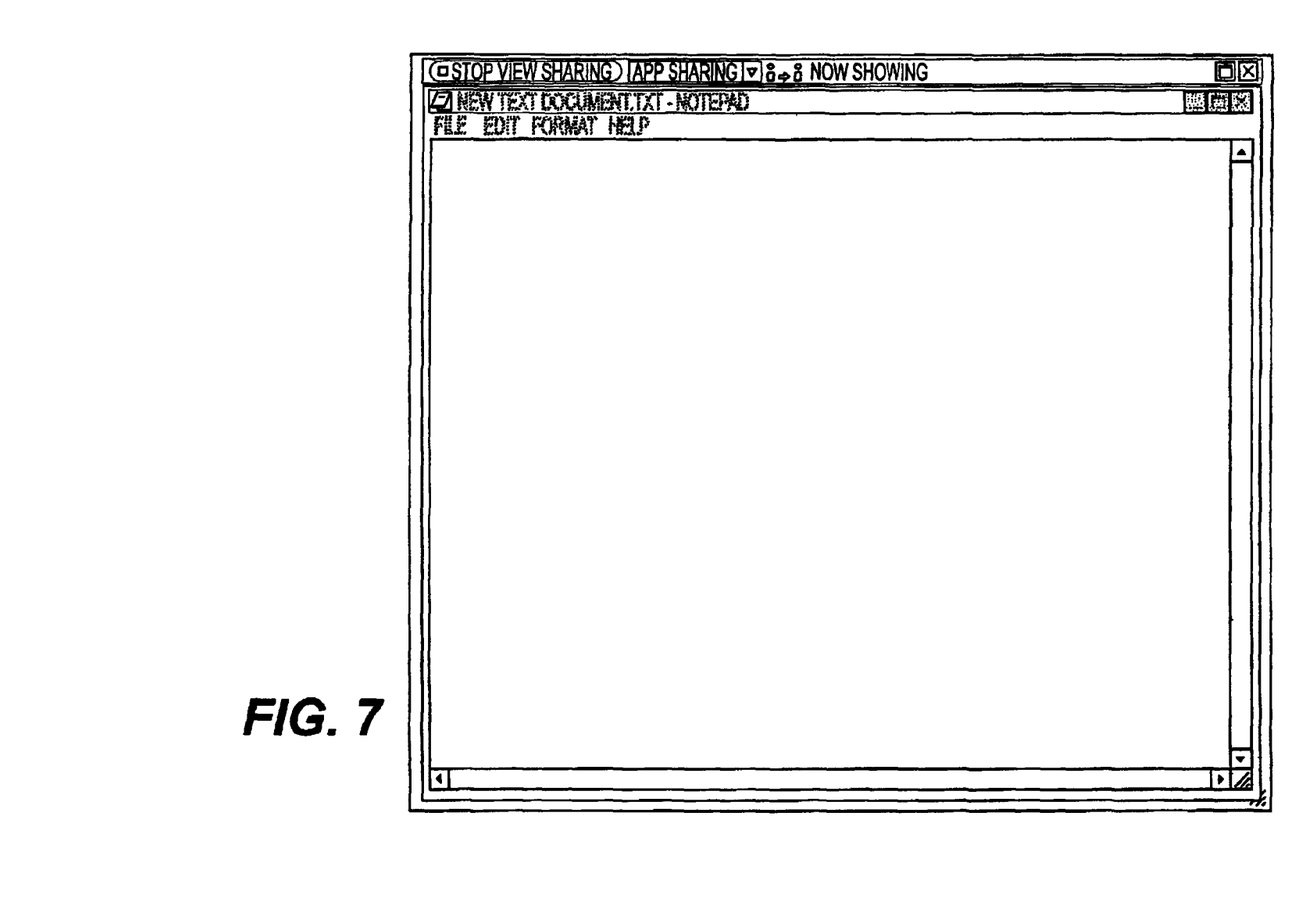
FIG. 7 is a representation of a sharing frame in accordance with a fifth embodiment of the present invention.

Window borders may also permit access to functionality that the sharing presenter may not wish to share. Referring to FIG. 5, there is shown a window containing sizing controls. A sharing participant accessing FIG. 5 could resize the shared windows or move windows exposing previously hidden or private information. Also, a sharing participant could accidentally close or minimize the windows, allowing access to other windows hidden behind the previously open window. To prevent this problem, one solution is to automatically resize a graphical sharing frame around the application window to crop out the window border of the window containing the sizing controls. Another solution is to gray out the window controls (shown in FIG. 6). A sharing presenter desiring to provide remote users with access to such sizing controls, may grant control of these functions by resizing the frame to show this border. Referring to FIG. 7, there is shown another embodiment of a sharing frame 300 in accordance with an alternate embodiment. In FIG. 7, the menu and window borders are grayed out to prevent a sharing participant from accessing the menu or the sizing controls.

Some keystrokes or inputs may provide a remote user undesired control over the presenter's computer, such as by changing the state of the presenter's computer. For example, a remote user depressing the 'CAPS LOCK' key could modify the presenter's desktop by causing all letters inputted to appear in capital form. In order to prevent unwanted changes to the logical state of the sharing presenter's computer, one embodiment of the present invention may implement controls to filter out other input from a mouse, keyboard, or other input devices on the remote user's side. In one embodiment, inputs are transmitted to the sharing presenter's computer where the keyboard events are entered and processed as if they were input at the presenter's computer. For example, instead of changing the state of the presenter's computer, the sharing module (not shown) on the participant's computer may maintain the state of the sharing participant's CAPS LOCK key. If the sharing participant's CAPS LOCK was enabled, then each keyboard event is simulated as an event with the shift key modifier. The keystroke transmitted to the presenter's computer could then be modified prior to transmission to the presenter's computer, negating any need to change the state of the presenter's computer. Consequently, the image depicted on the user's computer will portray one image (all caps), while the presenter's computer will display a second image (normal capitalization). This same principle may be applied to prevent a remote user from performing unauthorized operations. That is, if a remote user attempts to access a menu item or resize a window, sharing module may filter the input from the incoming data stream to prevent the unauthorized input from adversely affecting the presenter's computer.

Different applications might have different security requirements. For example, in one application a presenter may want to share a particular menu in the menu bar but not others. The File menu from the above example gives access to the 'Open' option, while the Edit menu gives access to acceptable functionality such as copy and paste. Configurations of this nature on a per-application basis may be complex but important from a security point of view. Maintaining this configuration automatically from session to session can improve the security of the session by reducing the likelihood of configuration errors. Thus when a user has shared a particular application, the sharing module saves the settings chosen by the user. For example, the user may specify that sharing with participant "A" will filter out sizing controls, and menu bars. The next time the user attempts to share the same application with the same participant, the sharing module will reinstate these same options. Then, if the options are changed, the new settings will be saved for a subsequent sharing session.

Even with all of the above features to limit a user's ability to control the sharing presenter's computer, the sharing presenter should always be in control. If necessary, she should be able to easily and quickly deny control to the sharing participant. Providing a "panic button" that is easily known and remembered may be a valuable method of retaining ultimate control. One possible consistent method is a short series of keystrokes or a single keystroke (e.g., button 310). For example, when a presenter has granted control to a sharing participant, she can decide to revoke that ability and stop application sharing by pressing the ESC key. In one embodiment, a presenter may vocally guide the sharing participant away from private areas or destructive features like the Delete option. However, if the participant chooses not to listen to the presenter, the presenter can immediately press the ESC key before anything unfortunate or embarrassing happens. While a sharing participant has control, a visible message might say "ESC to cancel sharing with USER-ID" to teach and remind the presenter the location of the "panic button".

Figure 8:
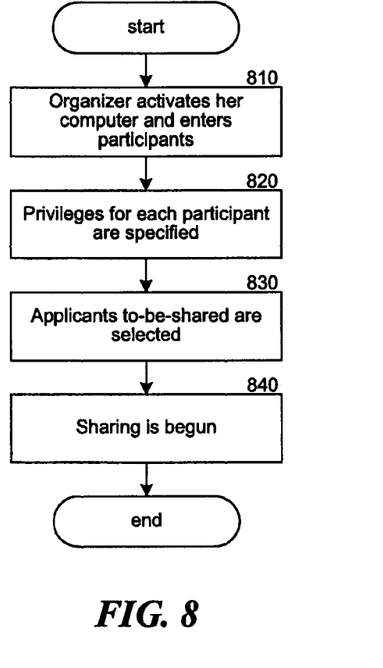
FIG. 8 is a detailed flowchart depicting the operation of the present invention in accordance with an exemplary embodiment.
Figure 9:
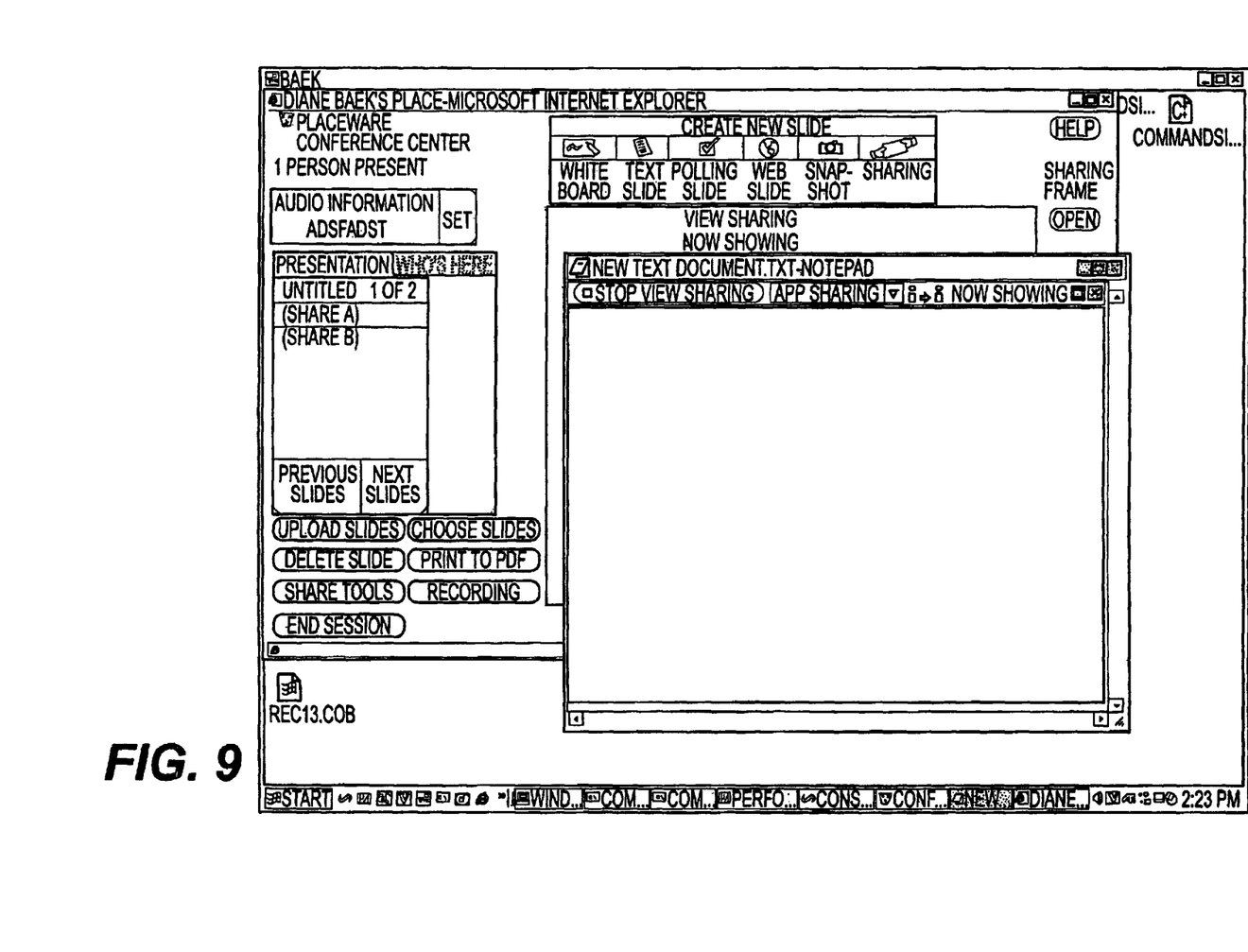
FIG. 9 depicts an image of a computer display during operation of the present invention.

Turning now to FIG. 8, there is shown a detailed flowchart depicting the use and operation of an embodiment of the present invention. In one such embodiment, software for executing the process depicted in FIG. 8 is loaded into RAM 202 for execution on microprocessor 201. As shown in FIG. 8, processing begins in step 810 when a first user (organizer) enters the appropriate keystrokes or mouse clicks to invoke computer 10. In one embodiment, the organizer enters the names (or other network identifiers) of the other participants (invitees). An example of a display that may be depicted on the organizer's computer is shown in FIG. 9. As shown, display 900 may include a numerical count of the number of participants present. It may alternatively include each participant's name and/or their network address. In the event that a count is maintained, the number of participants will be incremented each time the organizer adds a new participant to the session. Once all the participants are inputted, processing flows to step 820, where the user privileges may be specified. User privileges can be used to maintain the controls and access which particular users are able to give, receive, set up, or otherwise change. "User" includes any one of the following individuals, an administrator, an organizer, a presenter or a participant.

An administrator is charged with setting the boundaries of the controls allowed to other users. For example, an administrator may limit the amount of control one user may grant to another user. More specifically, an administrator may allow an organizer to grant sharing control or may prohibit organizers from setting up a meeting in which control is granted to other users. An organizer sets up a meeting in which presenter(s) and participant(s) share control of a computer or computers. The organizer may grant any controls allowed by the administrator.

In an exemplary embodiment, the security level may be specified: (A) for the entire community of users; (B) for a group of users in the community; (C) on a meeting-by-meeting basis; or (D) on an individual basis.

A. Controlling Application Sharing (AS) Privileges for an Entire Community

The ability to globally control application sharing for an entire community of users may be desirable. For example, these controls could activate all application sharing, single application sharing only, or view sharing only or these controls could disable all application sharing for a particular community of users. If disabling is requested, no user in that community can use application sharing and no meetings in the community will have any application sharing capability. If view sharing only is requested, an organizer may allow presenters in the community to show other participants an application remotely, but presenters may not grant participants control of the application. If single application sharing only is requested, then organizers may create meetings with single application sharing capability. Presenters may grant participants control of a single application, but cannot grant control over all windows or icons visible within the frame. If all application sharing capability is requested, then organizers may create meetings with any type of sharing capability.

B. Controlling AS Privileges for a Particular User or Group of Users in that Community Controls allowing an administrator to give certain users or groups of users more privileges may alternatively be desirable. If some presenters need more application sharing capability, an administrator may set individual privileges for each presenter. These privileges would allow presenters to grant privileges to each user based on various factors including the level of technical sophistication of each user, the degree of user interaction required, and the level of technical sophistication of the subject matter to be discussed. For example, a user may be given the privilege to only share a single application when that user is created by an administrator. At creation time, the administrator may have three options for granting users application sharing privileges:

1. Disable—The User cannot enable Application Sharing for a meeting.
2. Single Application—The User can enable only single Application Sharing for a meeting.
3. (Advanced User only) Single Application and Desktop—The User can enable single or desktop Application Sharing for a meeting. (If the presenter chooses to share the desktop, everything viewable by the remote user, including desktop icons is available to that user.)

C. Controlling Application Sharing Privileges on a Per-Meeting Level

An organizer in a community also may want to specify different application sharing abilities for a particular session. For example, once the administrator has set up a user, the organizer could then in turn decide how sophisticated a particular meeting is when scheduling a meeting. The organizer could turn on only what is granted by the administrator. When scheduling or modifying a meeting in this example, a fully privileged user would see the follow choices:
1. Application Sharing is disabled.
2. Application Sharing is enabled for a single application.
3. Application Sharing is enabled for everything in the frame.

Once the privileges for each user are specified (step 820), processing flows to step 830 where the applications to-be-shared are selected. As stated above, the presenter may select applications by logically placing them inside sharing frame 300 or by simply identifying the applications and relying on sharing module (not shown) to automatically resize sharing frame 300 to accommodate the new application. Once the application(s) are selected processing flows to step 840 where the sharing presenter initiates View or Application sharing.

From the foregoing description, it will be appreciated that the present invention provides an efficient system and method for providing application sharing security. The present invention has been described in relation to particular embodiments, which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Despite the fact that aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIG. 8. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems, which may be used in practicing the instant invention and, therefore, no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

We claim:

1. A method in a computer for sharing between a presenter and a participant, the method comprising:
displaying a sharing frame on a display of the presenter, the sharing frame encompassing a portion of the display, the portion of the display displaying a window of an application;
sending the portion of the display encompassed by the sharing frame that includes the window to a computer of the participant for display to the participant; and
after the presenter moves the window to outside of the sharing frame, sending the portion of the display encompassed by the sharing frame that no longer includes the window to the computer of the participant for display to the participant to terminate the sharing of the window.

2. The method of claim 1 wherein the presenter moves the window by dragging and dropping the window from inside the sharing frame to outside the sharing frame.

3. The method of claim 1 wherein after the presenter moves a second window into the sharing frame, sending the portion of the display encompassed by the sharing frame that now includes the second window to the computer of the participant to share the second window.

4. The method of claim 1 wherein the sending of the portion of the display encompassed by the sharing frame that includes the window is in response to the presenter indicating to start sharing.

5. The method of claim 1 wherein after the presenter resizes the sharing frame, sending a second portion of the display encompassed by the moved sharing frame to the computer of the participant for display to the participant.

6. The method of claim 1 wherein after the presenter moves the sharing frame, sending a second portion of the display encompassed by the moved sharing frame to the computer of the participant for display to the participant.

7. The method of claim 1 wherein the sharing is view sharing.

8. The method of claim 1 wherein the sharing is application sharing.

9. The method of claim 1 wherein a cue is displayed to indicate when the sharing frame is being shared.

10. A computing device for sharing a window between a presenter and a participant, the computing device comprising:
a memory storing computer-executable instructions for:
displaying a sharing frame on a display of the presenter, the sharing frame encompassing a portion of the display;
after the presenter moves a window into the sharing frame, sending the portion of the display encompassed by the sharing frame that includes the window to a computer of the participant to share the window with the participant; and
after the presenter moves the window of the application to outside of the sharing frame, sending the portion of the display encompassed by the sharing frame to the computer of the participant for display to the participant to terminate the sharing of the window; and
a processor for executing the computer-executable instructions stored in the memory.

11. The computing device of claim 10 wherein the presenter moves the window by dragging and dropping the window from inside the sharing frame to outside the sharing frame.

12. The computing device of claim 10 wherein the presenter moves the window by selecting an icon representing an application that is displayed outside the sharing frame.

13. The computing device of claim 10 wherein the sending of the portion of the display encompassed by the sharing frame that includes the window is in response to the presenter indicating to start sharing.

14. The computing device of claim 10 wherein the computer-executable instructions are further for, after the presenter resizes the sharing frame, sending a second portion of the display encompassed by the resized sharing frame to the computer of the participant for display to the participant.

15. The computing device of claim 10 wherein the computer-executable instructions are further for, after the presenter moves the sharing frame, sending a second portion of the display encompassed by the moved sharing frame to the computer of the participant for display to the participant.

16. A computer-readable storage device containing instructions for controlling a computer to share a window between a presenter and a participant, by a method comprising:
- receiving from the presenter an indication to display a sharing frame;
- after receiving the indication to display the sharing frame, displaying the sharing frame on a display of the presenter, the sharing frame encompassing a portion of the display;
- receiving from the presenter an indication to share the displayed sharing frame;
- after receiving the indication to share the displayed sharing frame, sending the portion of the display encompassed by the sharing frame to a computer of the participant for display to the participant.

17. The computer-readable storage device of claim 16 wherein before receiving the indication to share the displayed sharing frame, the presenter moves a window of an application from outside the sharing frame to inside the sharing frame so that that window is shared with the participant.

18. The computer-readable storage device of claim 17 wherein when the presenter moves the window of the application to outside of the sharing frame, sending the portion of the display encompassed by the sharing frame to the computer of the participant for display to the participant to terminate the sharing.

19. The computer-readable storage device of claim 16 wherein before receiving the indication to share the displayed sharing frame, the presenter moves the sharing frame to encompass a different portion of the display.

\* \* \* \* \*